(12) United States Patent
Singleton et al.

(10) Patent No.: US 9,875,770 B1
(45) Date of Patent: Jan. 23, 2018

(54) DEVICES AND METHODS FOR READING MAGNETIC MEDIA

(71) Applicant: AVAGO TECHNOLOGIES GENERAL IP (SINGAPORE) PTE. LTD., Singapore, SC (US)

(72) Inventors: Jefferson Elliott Singleton, Longmont, CO (US); George Mathew, San Jose, CA (US); Kurt J. Worrell, Berthoud, CO (US); Scott Dziak, Fort Collins, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/495,124

(22) Filed: Apr. 24, 2017

(51) Int. Cl.
*G11B 5/09* (2006.01)
*G11B 20/10* (2006.01)

(52) U.S. Cl.
CPC .. *G11B 20/10046* (2013.01); *G11B 20/10037* (2013.01)

(58) Field of Classification Search
CPC ... G11B 20/20; G11B 20/16; G11B 20/10529; G11B 20/10009; G11B 20/1419; G11B 20/18; G11B 5/02; G11B 5/11; G11B 5/09; H04L 25/03057; H04L 25/03019

USPC ........ 360/22, 24, 39, 25, 32, 43, 65, 55, 67; 369/44.41, 44.42; 375/341, 233
See application file for complete search history.

(56) References Cited

U.S. PATENT DOCUMENTS

| | | | |
|---|---|---|---|
| 9,058,115 B1 * | 6/2015 | Xiao | G11B 20/10046 |
| 9,147,429 B1 | 9/2015 | Hwang | |
| 9,236,087 B1 | 1/2016 | Dahlberg | |
| 9,524,748 B2 | 12/2016 | Park et al. | |

* cited by examiner

*Primary Examiner* — Nabil Hindi
(74) *Attorney, Agent, or Firm* — Sheridan Ross P.C.

(57) ABSTRACT

An apparatus for reading data from a magnetic storage medium includes a plurality of magnetic read heads each configured to read a track of the magnetic storage medium and generate an analog data signal corresponding to the read track. The apparatus includes a converter to generate digital data samples from the analog data signals, and a plurality of equalizers to apply a plurality of coefficients to the digital data samples to generate a plurality of equalized signals. The plurality of coefficients are associated with different locations within the track. The apparatus includes a plurality of detectors to compute metrics and detect data bits for the plurality of equalized signals, and at least one selector to select one of the plurality of equalized signals that has a best metric from the computed metrics and to output the selected equalized signal.

20 Claims, 7 Drawing Sheets

DEVICES AND METHODS FOR READING MAGNETIC MEDIA

FIELD OF THE DISCLOSURE

The present disclosure is generally directed to devices and methods for reading magnetic media, for example, in array reader based magnetic recording (ARMR) systems.

BACKGROUND

The hard disk drive (HDD) industry continues to develop array reader based magnetic recording technology in which multiple read heads are simultaneously used to read data from a magnetic recording medium. Here, it is desired to electronically steer the array reader to provide optimum signal pick-up from a track of the recording medium, thereby reducing read errors and improving performance of the array reader. Achieving these goals is at least in part accomplished by applying proper equalizing coefficients to the data signals generated by each read head, for example, by applying coefficients that are estimated to correspond to the locations of the read heads on the track. However, the locations of the read heads on the track are difficult to estimate, especially for read operations that occur shortly after the read heads relocate to the target track and for read operations in which consecutive sectors desired to be read were not written sequentially. This leads to a mismatch between the locations of the read heads and the equalizing coefficients, which causes degradation in the quality of samples at an equalizer output. Accordingly, it is desired to develop devices and/or methods that address these and other problems of the related art.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "includes," "including," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

With reference to FIGS. 1-7, various embodiments of the present disclosure will be described. While many of the examples depicted and described herein will relate HDDs, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a hybrid HDD/SSD storage controller or some other type of device used in a communication system). In particular, hard drives, hard drive controllers (e.g., SCSI controllers, SAS controllers, RAID controllers, etc.) may be configured to implement example embodiments. As another example, network cards or the like having cache memory may also be configured to implement example embodiments.

Figure 1A:
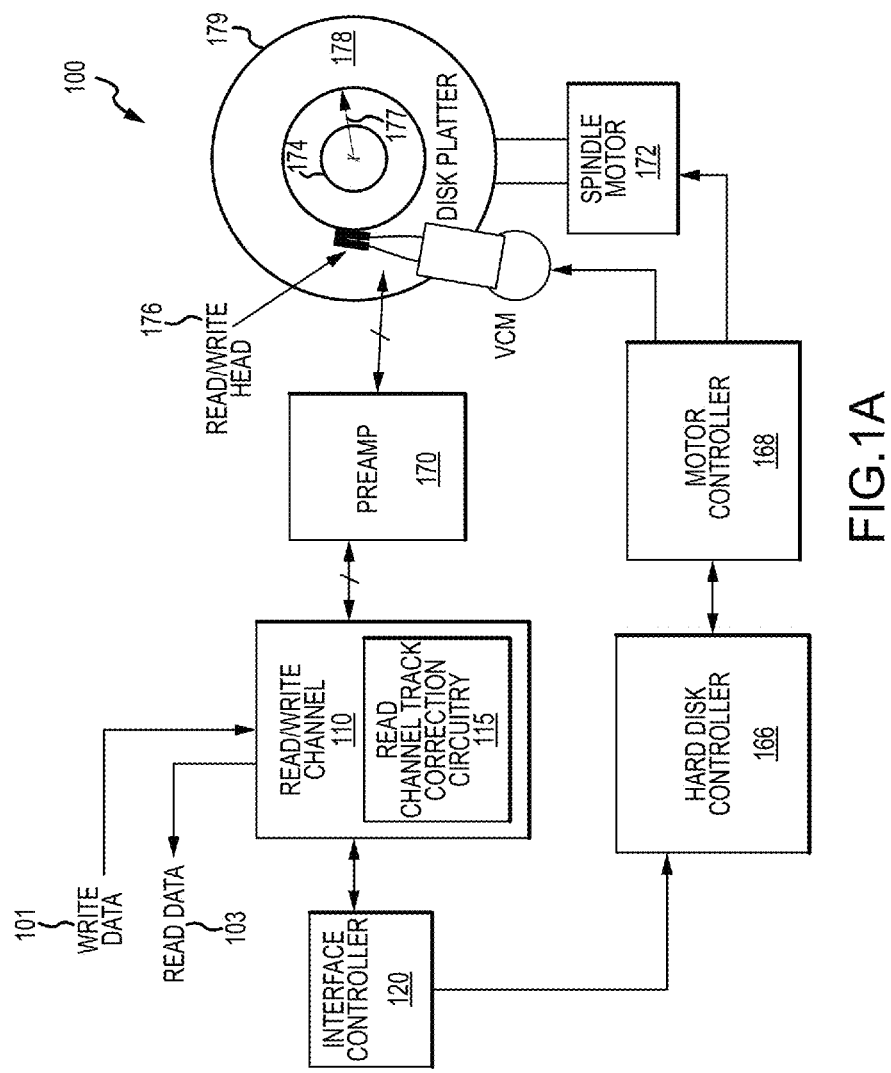
FIG. 1A is a block diagram depicting a storage system in accordance with at least one example embodiment.

Turning to FIG. 1A, a storage system 100 includes a read/write channel circuit(s) 110 having agile track correction circuitry 115 in accordance with at least one example embodiment. Storage system 100 may be, for example, a hard disk drive (HDD). Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The interface controller 120 may include devices such as a processor, buffer memory, format control, error correction circuits, and interface circuits. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme. The data on disk platter 178 is stored as tracks that are located between an inner diameter 174 and an outer diameter 179. At a radius somewhere between inner diameter 174 and outer diameter 179 a skew angle of read/write head assembly 176 relative to the track at the particular diameter is zero degrees, with the skew angle increasing as read/write head assembly approaches the extremes of outer diameter 179 and inner diameter 174.

During a write operation, read/write channel 110 receives write data 101 to be stored on the disk platter 178. The write data 101 may be received in serial form on a standardized device interface such as a Serial Advanced Technology Attachment (SATA) interface. During write operations, the write data 101 is stored in a local buffer memory, formatted and augmented with error correction codes.

Read/write channel 110 may process the digital write data 101 in a number of ways, such as serializing the data, modulation coding the data and adding parity bits, serializing the data at the desired bit-rate, and performing magnetic write precompensation, and the resulting write signal waveform containing the data to be written is given by the read/write channel 110 to a write driver in the preamplifier 170. In some embodiments, the preamplifier 170 is mounted on an actuator arm of the read/write head assembly 176, and the write signal waveform is driven from the read/write channel 110 by transmitters and delivered over a flex-cable in differential positive emitter-coupled logic (PECL) format to the arm-mounted preamplifier 170. The preamplifier 170 converts the write signal waveform to a high-current analog write signal, and impresses in the read/write head assembly 176 a bipolar programmable write current (or first driver signal) of polarity determined by that of the encoded write data signal.

In a typical read operation, read/write head assembly 176 is accurately positioned by motor controller 168 over a desired data track on disk platter 178. Motor controller 168 both drives the spindle motor 172 and positions read/write head assembly 176 to the proper data track on disk platter 178 under the direction of hard disk controller 166. Spindle motor 172 spins disk platter 178 at a determined spin rate (RPMs). A read circuit in the preamplifier 170 establishes a bias current in the magneto-resistive read/write head assembly 176. Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal(s) representative of the magnetic data on disk platter 178. This minute analog signal(s) is transferred from read/write head assembly 176 to the read circuit in the preamplifier 170, where it is amplified and is conveyed to the read channel track correction circuitry 115 of the read/write channel 110 as analog read data. In turn, the read channel track correction circuitry 115 performs operations discussed with reference to FIGS. 2-7 including digitization (e.g., by an analog to digital converter (ADC)), equalization and detection to recreate the user data originally written to disk platter 178 before the read data is decoded (e.g., by a data decoder circuit such as a low density parity check (LDPC) decoder circuit) and output as read data 103.

As part of processing the analog read data, read/write channel 110 may perform one or more operations such as analog filtering, variable gain amplification, analog to digital conversion, equalization, timing recovery, data detection, decoding, deserialization, and servo demodulation to obtain the user data and servo information. The user data is provided by read/write channel 110 as digital read data 103 (e.g., after being error corrected, stripped of special formatting fields, and reassembled in buffer memory). The read/write channel 110 also provides servo data to the interface controller 120 for use in driving the hard disk controller 166 and motor controller 168. During both the read and write operations, microcode in the interface controller 120 controls spindle speed and regulates head position to maintain accurate track-following and to seek between tracks. Servo position information for these functions is demodulated by the read/write channel 110 from dedicated fields prerecorded on the disk platter 178 at intervals between data records. However, it should be understood that the read/write head assembly 176 may include additional elements such as a fly-height sensor and/or heater. It should also be understood that, though not shown in FIG. 1A explicitly, the read channel track correction circuitry 115 could include a low density parity check (LDPC) decoder circuit as are known in the art. This LDPC decoder circuit acts to detect and correct errors in the stream of bits detected from the analog signal supplied to the read channel track correction circuit 115.

It should be noted that storage system 100 may be integrated into a larger storage system such as, for example, a RAID (redundant array of inexpensive disks or redundant array of independent disks) based storage system.

It should also be noted that various functions or blocks of storage system 100 may be implemented in either software or firmware, while other functions or blocks are implemented in hardware. The various blocks disclosed herein may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

According to at least one example embodiment, the read/write head assembly 176 includes two or more read heads capable of sensing data from two or more tracks at the same time, or for sensing multiple instances of the same track. An example of read/write assembly 176 is shown in FIG. 1B.

Figure 1B:
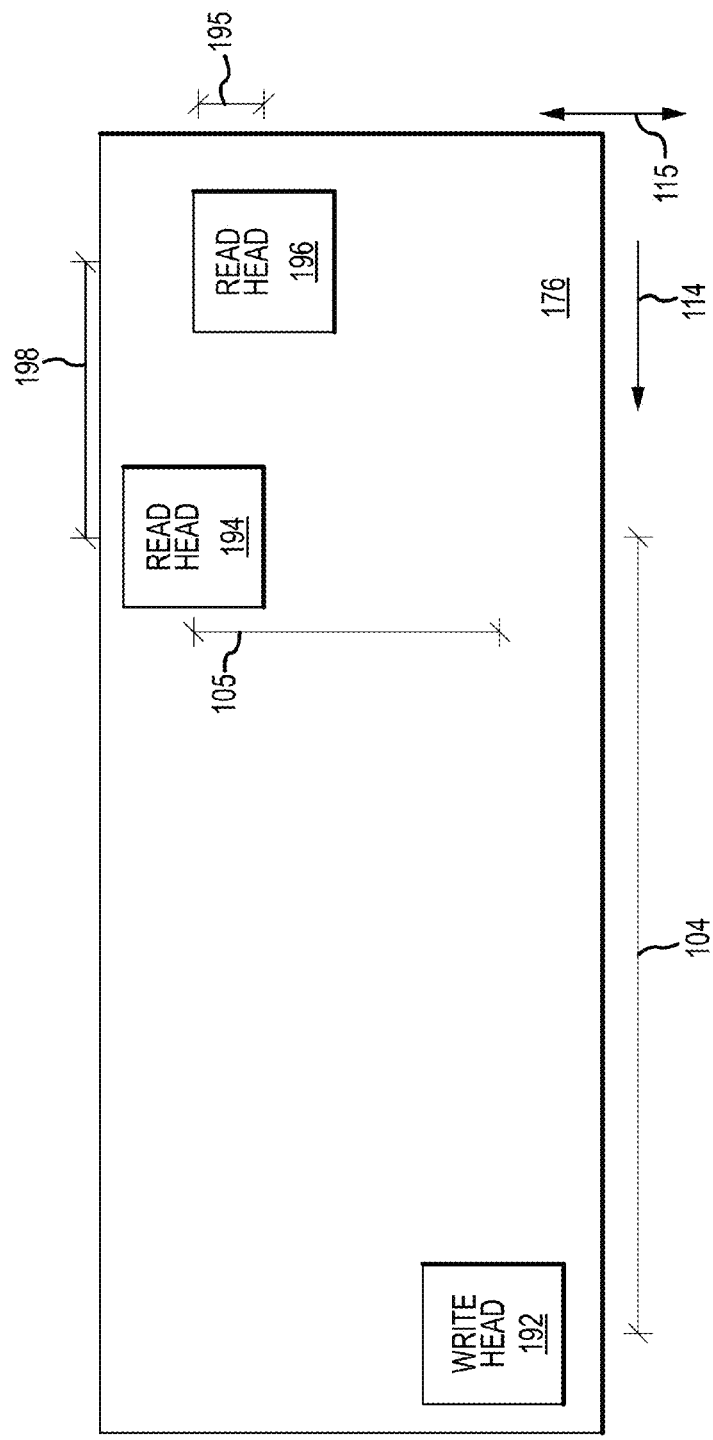
FIG. 1B is a block diagram depicting example details of an illustrative read/write head assembly in accordance with at least one example embodiment.

Turning to FIG. 1B, an example of read/write head assembly 176 is shown that includes a reader with two read heads 194, 196 that are physically separated in a down track direction 114 by a distance 198, and in a cross-track direction 115 by a distance 195. However, example embodiments are not limited thereto, and the read heads 194, 196 may be aligned such that distance 195 does not exist. That is, the read heads 194 and 196 do not necessarily have to be physically separated in the cross-track direction 115. Read/write head assembly 176 moves over the surface of a storage medium (e.g., disk platter 178) in down track direction 114 as it is sensing data from a given track. As read/write head assembly 176 is moved between tracks it is moved in cross track direction 115. Each of read heads 194, 196 are capable of sensing information from disk platter 178. In addition, read/write head assembly 176 includes a write head 192 that is capable of writing data to disk platter 178. It should be noted that distances 195, 198 between read heads 194, 196 and distances 104, 105 between read heads 194, 196 and write head 192 are not drawn to proportion. As an example, distance 198 may be on the order of 100 nm, and distance 104 may be between 2-5 µm. Distance 195 may be less than the width of a track on disk platter 178, and distance 105 may be, for example, on the order of 100 track widths. Thus, FIG. 1B is intended to show the specific elements included in read/write head assembly 176.

Figure 2:
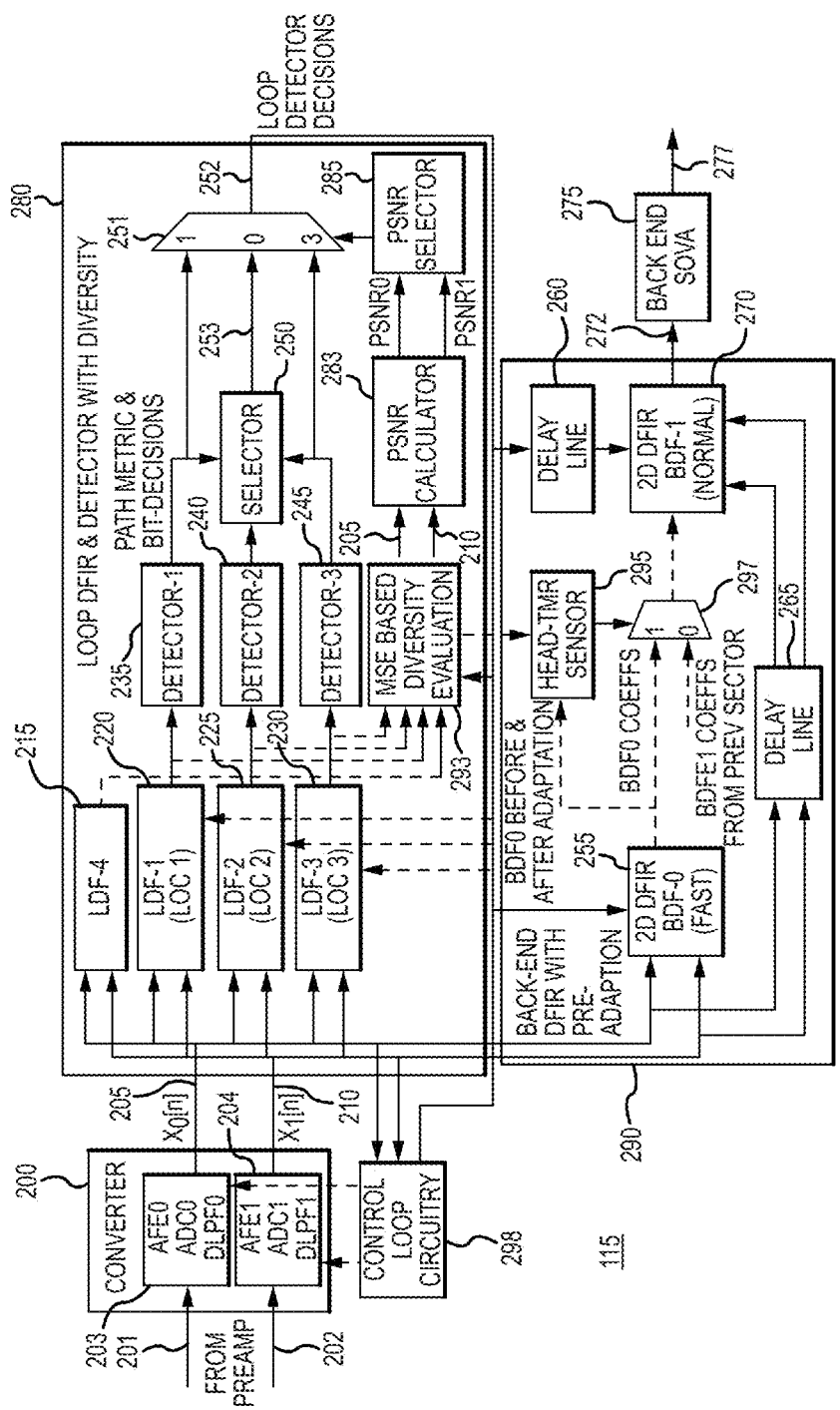
FIG. 2 is a block diagram depicting an example of the read channel track correction circuitry of FIG. 1A according to at least one example embodiment.

FIG. 2 illustrates the read channel track correction circuitry 115 shown in FIG. 1A.

FIG. 2 illustrates diversity loop and detector front-end component(s) 280 including a converter 200 with converter components 203 and 204 for receiving analog signals 201 and 202 from the preamplifier 170 corresponding to the signals sensed by the readers 194 and 196, respectively. The converter components 203 and 204 amplify the analog signals 201 and 202 (e.g., with analog front end (AFE) circuitry), converts the amplified analog signals to digital signals (e.g., with analog to digital converter (ADC) circuitry), and applies filter functions (e.g., with a digital low pass filter (DLPF)) to generate digital samples 205 (or $X_0[n]$) and 210 (or $X_1[n]$).

The diversity loop DFIR (digital finite impulse response) and detector front-end component(s) 280 of the read channel track correction circuitry 115 also includes a plurality of loop equalizers 215, 220, 225, and 230 (also labeled as LDFs (loop DFIRs) 1-4), a plurality of loop detectors 235, 240, and 245, a selector 250, a multiplexer 251, a preamble signal-to-noise ratio (PSNR) calculator circuit 283, a PSNR based selector circuit 285, and a mean-squared-error (MSE) based diversity evaluation circuit 293. The converter 200 and loop DFIR and detector front-end component(s) 280 are collectively referred to as front-end component(s) of the read channel track correction circuitry 115. The read channel track correction circuitry 115 also includes control loop circuitry 298.

The plurality of loop equalizers 215, 220, 225, and 230 may be 2-dimensional (2-D) digital finite impulse response filters (DFIRs) that apply a plurality of coefficients to the digital data samples 205 and 210 to generate a plurality of equalized signals. Each equalizer in the plurality of loop equalizers 215, 220, 225, and 230 receives the plurality of data samples 205 and 210, applies one of the plurality of coefficients, and outputs one of the plurality of equalized signals. Loop equalizers 220, 225, and 230 output their respective equalized signal to a respective one of the loop detectors 235, 240, and 245. Loop equalizers 215, 220, 225, and 230 also supply their equalized signals to the MSE based diversity evaluation circuit 293. The MSE based diversity evaluation circuit 293 compares the MSE of the outputs of loop equalizers 215, 220, 225 and 230 that have been computed over a window of a desired length. The MSE is computed by summing the squared values of the error signals at the outputs of each of these equalizers 215, 220, 225, and 230. The error signal is determined by taking the difference between the equalizer output and an ideal equalizer signal, where the ideal equalizer signal is computed using the loop detector decisions 252 (or intermediate signal 252). From among the loop equalizers 215, 220, 225 and 230, the loop equalizer with minimum MSE is declared to have won the diversity test in that window over which the MSE is evaluated. The loop equalizer 215 plays the role of holding the reference coefficients of the loop equalizer from among 220, 225 and 230 that is being adapted, or acts as a stand-by loop equalizer that can take over when one of the loop equalizers 220, 225 or 230 is found to be not suitable for use in the specific fragment, as will be described later in this application in relation to FIGS. 6 and 7.

According to at least one embodiment, the plurality of coefficients are associated with different locations Loc 1, Loc2, and Loc 3 within the read track of the disk platter 178. For example, the different locations within the track include a first location, a second location, and a third location. The plurality of loop equalizers includes at least a first loop equalizer 220 applying a first coefficient associated with the first location, a second loop equalizer 225 applying a second coefficient associated with the second location, a third loop equalizer 230 applying a third coefficient associated with the third location. In one embodiment, the second location is near a center of the track, and the first location and the third location are offset from the second location on both sides of the second location. For example, the first location can be on a left side of the second location while the third location is on a right side of the second location. In other words, the first location and the third location are on opposite sides of the second location within the track (see FIGS. 6 and 7 for more detail regarding the plurality of coefficients being associated with different locations in the track).

It should be understood that the plurality of coefficients may be a design parameter set based on empirical evidence and/or user preference. In one embodiment, the plurality of coefficients are predetermined and set during the manufacturing stage based on calibration operations that determine where the read heads 194 and 196 are most likely to read from within a track of the magnetic storage medium. Alternatively, the plurality of coefficients are changeable (e.g., by changing values of registers that store the coefficients). Further, it should be understood fewer or more read heads and/or equalizers may be employed by example embodiments depending on design preferences.

The plurality of detectors 235, 240, and 245 detect data bits from the plurality of equalized signals from loop equalizers 220, 225 and 230, respectively. These detected data bits are supposed to correspond to the user data originally written to the track from which the readers 194 and 196 sensed magnetic signals. In one embodiment, the loop detectors 235, 240, and 245 output detected bits as well as path metrics constructed based on the equalized signals. The data detection algorithm used by each loop detector may be, but not limited to, a Viterbi detection algorithm or a maximum a posteriori detection algorithm, as are known in the art. The path metrics may be determined by comparing the equalized signal against various possible candidates for the ideal version of the equalized signal.

The selector 250 selects a loop detector having the minimum path metric and outputs the detected bits from the selected detector as diversity loop detector decisions 253. The selector 251 under the direction of PSNR based selector 285 selects the diversity loop detector decisions 253 or the detector bits from loop detectors 235 or 245 as the final loop detector decisions 252. The loop detector decisions 252 are given to other parts of the circuit, namely, the loop equalizers 220, 225 and 230, the back-end with pre-adaptation circuit 290 and control loop circuitry 298. The control loop circuitry 298 use the loop detector decisions 252 and digital signals 205 and 210 to drive the different control loops for the read channel track correction circuitry 115, such as timing loops, gain loops, DC offset loops, nonlinearity correction loops, etc. in converter 200, using algorithms known in the art. The loop equalizers 220, 225 and 230, and the back-end with pre-adaptation circuit 290 use the loop detector decisions 252 to drive adaptation algorithms for adjusting the coefficients of the loop equalizers 215, 220, 225 and 230 and back-end equalizers 255 and 270 contained in these blocks to result in equalized signals that will lead to best performance in detecting the user data bits from the equalized signals. The adaptation algorithm used for adjusting the coefficients of the equalizer may be, but is not limited to, the LMS (least mean square) adaptation algorithm, as is well known in the art.

To further illustrate the functions of the loop detectors 235, 240, and 245, and the selector 250, consider an example where loop equalizer 225 applies a coefficient associated with (or matched to) a center of the track, loop equalizer 220 applies a coefficient associated with a left side of the track, and loop equalizer 230 applies a coefficient associated with a right side of the track. If the readers 194 and 196 are reading data from close to the center of the track, then the loop detector 240 outputs a relatively small path metric while loop detectors 235 and 245 output relatively large path metrics. In this case, the selector 250 selects the detected bits from loop detector 240 as the diversity loop detector decisions 253 because loop detector 240 has the lowest path metric. On the other hand, if the readers 194 and 196 read from, for example, a left side of the track, then the loop detector 235 would output a relatively small path metric, while loop detector 240 outputs a relatively larger path metric, and loop detector 245 outputs an even larger path metric than loop detector 240 (because the read heads 194 and 196 read at a location in the track furthest away from the location associated with the coefficient for the loop equalizer 230 that feeds loop detector 245). In this case, the selector 250 selects the detected bits from loop detector 235 as the diversity loop detector decisions 253 because loop detector 235 has the smallest path metric.

In at least one example embodiment, a PSNR based selector circuit 285 is used to determine if the loop detector decisions 252 should be taken from the output of the selector 250 or from the outputs of the loop detectors 235 or 245. If the reader-array is situated at large offsets from the middle of the track, the PSNR based selector circuit 285 outputs a signal to multiplexer 251 that chooses loop detectors 235 or 245 instead of the diversity loop detector decisions 253 from selector 250. The PSNR based selector circuit 285 detects the condition of such large offsets in reader-location by comparing the metrics PSNR0 and PSNR1 from the PSNR calculator circuit 283 in FIG. 2. Metric PSNR0 is the ratio of the energy of the preamble in digital sample 205 to the energy of the non-preamble portion of the digital sample 205. Similarly, metric PSNR1 is the ratio of the energy of the preamble in digital sample 210 to the energy of the non-preamble portion of the digital sample 210. In at least one example embodiment, the orthogonal preamble-structure used in the sector format of dual-reader hard disk drives consists of using the data-pattern {1, 1, 0, 0} of period 4 bits and the data-pattern {1, 1, 1, 0, 0, 0} of period 6 bits in alternative tracks. If the absolute value of the difference between PSNR0 and PSNR1 exceeds a threshold value, then a PSNR-Genie mode is triggered. In PSNR-Genie mode, a secondary selector (or multiplexer) 251 chooses loop detector 235 if PSNR0<PSNR1 and chooses loop detector 245 if PSNR0>PSNR1 if cross-track separation between the reader 194 and reader 196 is positive. In PSNR-Genie mode, the secondary selector 251 chooses loop detector 245 if PSNR0<PSNR1 and it chooses loop detector 235 if PSNR0>PSNR1 if cross-track separation between the 194 and 196 is negative. The value of PSNR threshold is a design parameter set based on empirical evidence and/or is user defined. In one example embodiment, the PSNR threshold is set to 6 dB for cross-track separation of 20%.

It should be understood that the disk platter 178 is divided into a plurality of zones and that the plurality of zones are sub-divided into a plurality of sectors to assist with tracking locations on the disk platter 178 for writing and reading data to/from. Thus, an entire sector refers one of the plurality of sectors while a partial sector is some fraction or segment of an entire sector. The sizes of the sectors and/or partial sectors may be design parameters set based on empirical evidence and/or user preference. Methods and devices according to at least one example embodiment may be applied on a per-sector basis and/or on a fragment basis, where a fragment refers to a portion of a sector that is smaller than the sector itself. Further, the loop equalizers 215, 220, 225, and 230 may be set with different initial coefficients (e.g., reference coefficients) depending on which zone a current sector or fragment (i.e., a sector or fragment undergoing a read operation) belongs to. That is, the loop equalizers 215, 220, 225, and 230 may be initialized with different coefficients if the sector or fragment being read is in a first zone than if the sector or fragment being read is in a second zone different from the first zone.

FIG. 2 shows that the read channel track correction circuitry 115 includes a back-end with pre-adaptation circuit 290 with one or more back-end components to apply at least one back-end coefficient to the digital signals 205 and 210 to generate an output signal 272. For example, the one or more backend components include a first back-end equalizer 255 (also labeled BDF-0) to generate a first back-end coefficient over a block of samples (i.e., digital data samples) of the digital signals 205 and 210 that corresponds to a partial sector or a partial fragment. In one example embodiment, the size of the block of samples that corresponds to a partial sector or a partial fragment is about 10,000 bits (e.g., if the storage system is reading data in 4K sector format). However, example embodiments are not limited thereto, and the size of the block of samples may vary according to design preferences.

The one or more backend components also include a second back-end equalizer 270 (also labeled BDF-1) to apply a second back-end coefficient to delayed versions of the digital signals 205 and 210 that corresponds to an entire sector or an entire fragment. The delayed version of the digital signals 205 and 210 is obtained by delay line (or delay element) 265. Correspondingly, the delay line 260 delays the loop detector decisions 252 also by the same delay as in delay line 265 such that the delayed versions of digital signals 205 and 210 and loop detector decisions 252 are aligned to carry out adaptation of the coefficients of the back-end equalizer 270. In the same way, the un-delayed versions of the loop detector decisions 252 and digital signals 205 and 210 are used for adaptation of the coefficients of the back-end equalizer 255.

The back-end equalizer 255 performs a pre-adaptation operation by using the digital signals 205 and 210 and the loop detector decisions 252 to adapt coefficients of the back-end equalizer 255 at a faster speed over a fraction of the current sector or current fragment (i.e., a partial sector or a partial fragment), while the back-end equalizer 270 adapts at a normal speed over the complete current sector or fragment (i.e., an entire sector or an entire fragment). Further, both back-end equalizers 255 and 270 may apply an LMS adaptation algorithm, which is known in the art, for their respective adaptation operations. According to one embodiment, back-end equalizer 255 adapts with a greater adaptation gain than back-end equalizer 270, for example, 4 times greater. The respective adaptation gains of the back-end equalizers 255 and 270 may be individually programmable values set based on empirical evidence and/or user preference.

Figure 3:
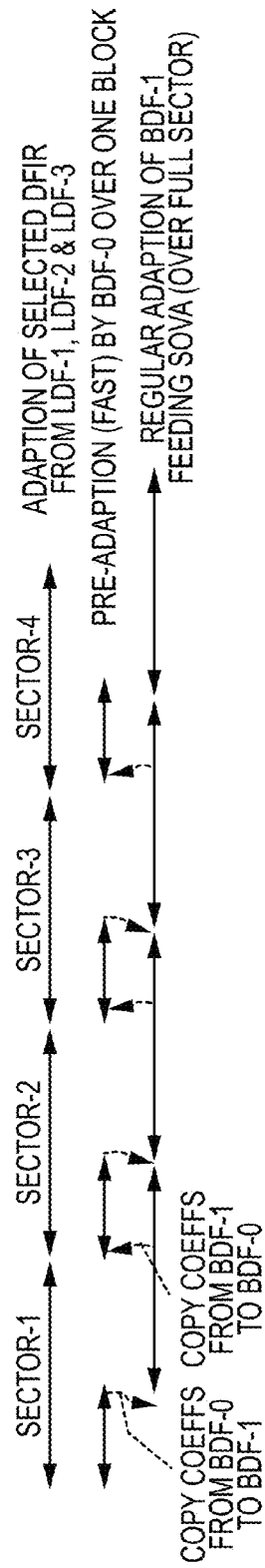
FIG. 3 illustrates an example sequencing of the adaptation operations described with respect to FIG. 2.
Figure 4:
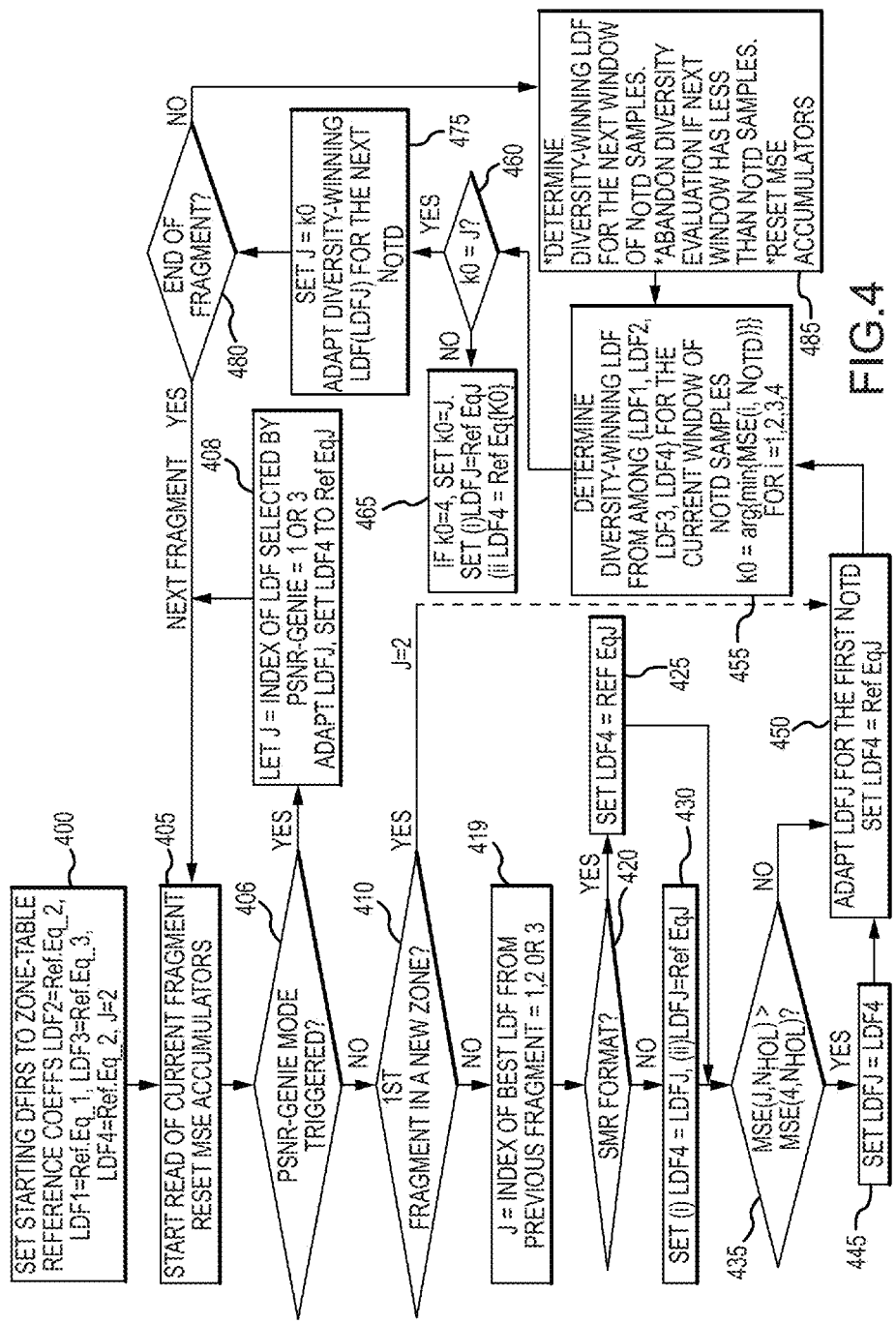
FIG. 4 is a flow diagram of an example method for operating the storage system described with respect to FIGS. 1-3.
Figure 5:
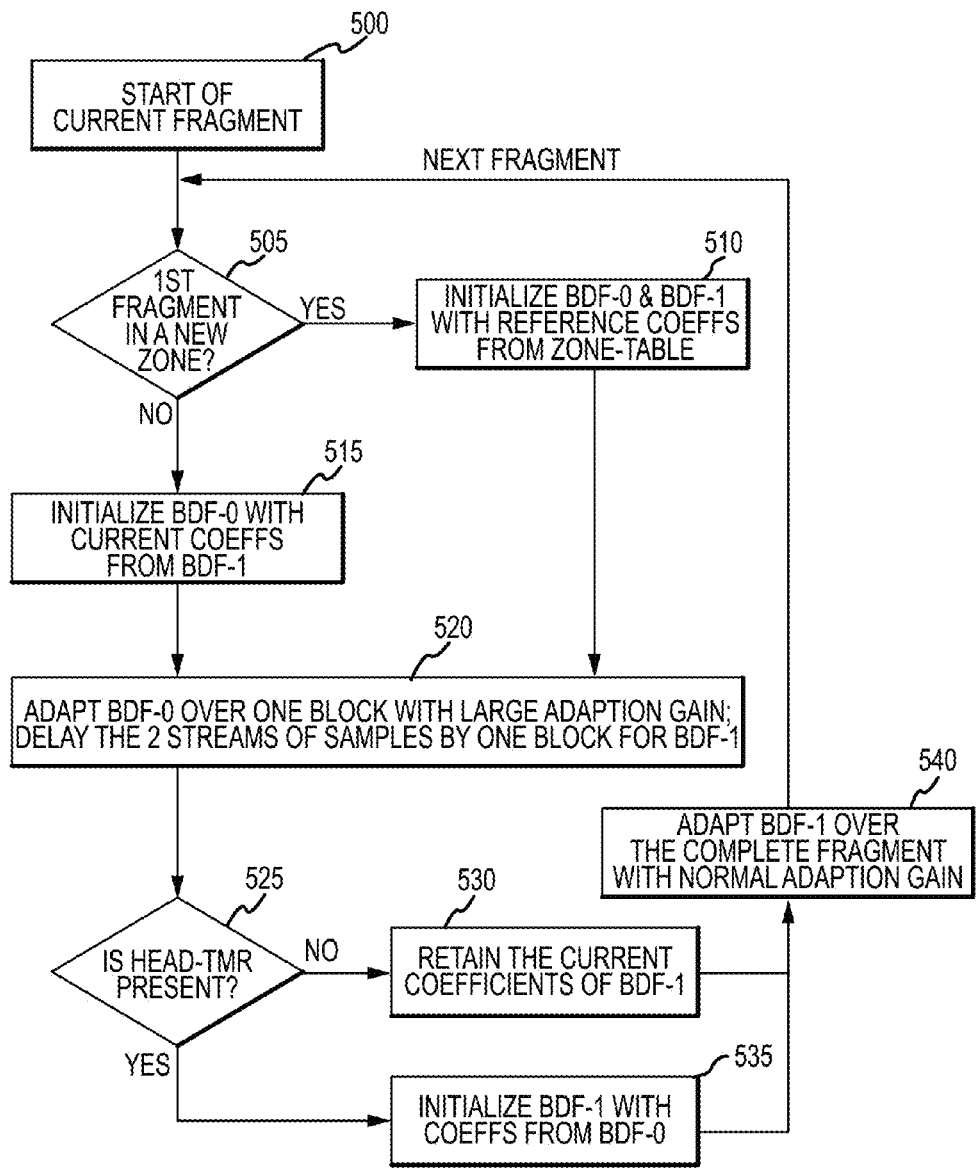
FIG. 5 illustrates an example method for the pre-adaptation and adaptation operations discussed with respect to FIGS. 1-4.

According to at least one example embodiment, the second back-end equalizer 270 is initialized with the first back-end coefficient (from back-end equalizer 255) if positions of the plurality of magnetic read heads 194 and 196 are determined to have changed from a read operation of a previous sector or fragment (e.g., as determined by head-TMR (track mis-registration) sensor 295). According to at least one other example embodiment, the second back-end equalizer 270 is initialized with a second back-end coefficient (from the back-end equalizer 270) from the read operation of the previous sector or fragment if the positions of the plurality of read heads 194 and 196 are determined to not have changed from the read operation of the previous sector or fragment. As shown in FIG. 2, selector (e.g., multiplexer) 297 selects which coefficients to copy to back-end equalizer 270 based on the output of head-TMR sensor 295. Whether the positions of the plurality of read heads 194 and 196 have changed from the previous sector or fragment is based on i) whether a difference between the first back-end coefficient of a current sector or fragment and the first back-end coefficient of the previous sector or fragment is greater than a threshold value; or ii) whether the loop equalizer that won the diversity test is different in current sector or fragment compared to previous sector or fragment. If either one of i) or ii) are true (i.e., the difference is greater than the threshold value or the loop equalizer that won the diversity test is different for the current sector or fragment), then positions of the read heads 194 and 96 are determined to have changed. If neither one of i) or ii) are true, then the positions of the read heads 194 and 196 are determined to not have changed. The threshold value applied to the difference in first back-end coefficient is a design parameter set based on empirical evidence and/or user preference. FIGS. 3-5 and related text describe the roles of the aforementioned back-end components 280 in further detail below.

The channel track correction circuitry 115 also includes a back-end detector 275 to detect data bits from the output signal 272. These detected data bits are supposed to correspond to the user data originally written to the track from which the readers 194 and 196 sensed magnetic signals. The data detection algorithm used by the back-end detector 275 may be, but not limited to, a Viterbi detection algorithm or a maximum a posteriori detection algorithm or a soft output Viterbi algorithm (SOVA), as are known in the art, applied to output signal 272 to generate final detected data bits 277. In one embodiment, the detected data bits 277 is sent to the LDPC decoder for error correction decoding before being provided as read data 103.

FIG. 3 illustrates a sequencing of the adaptation operations described with respect to equalizers 255 and 270 shown in FIG. 2.

FIG. 3 illustrates the sequencing of the adaptation operations for four sectors 1-4. As shown in FIG. 3, pre-adaptation by back-end equalizer 255 begins as digital samples 205 and 210 and loop detector decisions 252 corresponding to Sector-1 data are received by the back-end equalizer 255. For example, back-end equalizer 255 begins adapting for Sector 1 data using coefficients from a previous adaptation operation of the previous sector (e.g., Sector-0, not shown). The back-end equalizer 255 is initialized with the coefficients from back-end equalizer 270 that were used at the end of the previous sector. If there was no previous sector, the back-end equalizer 255 begins adapting with predetermined (or reference) coefficients set in advance, for example, during the manufacturing stage.

As shown in FIG. 3, back-end equalizer 255 performs pre-adaptation over only part of Sector-1 to generate a set of coefficients, and then copies the set of coefficients to back-end equalizer 270 if positions of the plurality of magnetic read heads 194 and 196 are determined to have changed from a read operation of the previous sector. If positions of the plurality of magnetic read heads 194 and 196 are determined to have not changed from a read operation of the previous sector, coefficients of back-end equalizer 270 remain same as what it had at the end of previous sector. Then, starting with these coefficients, the back-end equalizer 270 begins normal adaptation using delayed versions of digital samples 205 and 210 and loop detector decisions 252 obtained through delay elements 265 and 260, respectively, over the complete sector. That is, normal adaptation of back-end equalizer 270 begins after back-end equalizer 255 completes pre-adaptation. As digital samples 205 and 210 of a next sector (e.g., Sector-2) is received by the back-end equalizer 255, the adapted coefficients of back-end equalizer 270 just before the end of Sector-1 are copied back to back-end equalizer 255 and used by back-end equalizer 255 to pre-adapt over a portion of the next sector (i.e., part of Sector-2).

Although FIG. 3 is described in terms of sectors, it should be understood that the same sequencing can apply to fragments.

FIG. 4 illustrates a method of operating the storage system 100 described with respect to FIGS. 1-3.

FIG. 4 is a flow diagram of a method for operating the storage system 100 described with respect to FIGS. 1-3. While a general order for the steps of the method is shown in FIG. 4, the method can include more or fewer steps or can arrange the order of the steps differently than those shown in FIG. 4. Generally, the method starts at operation 400 and ends at operation 480. The method can be executed as a set of computer-executable instructions executed by the interface controller 120 and encoded or stored on a computer readable medium. Alternatively, the operations discussed with respect to FIG. 4 may be implemented by the various elements of the storage system 100 described with respect to FIGS. 1-3. Hereinafter, the FIG. 4 shall be explained with reference to the systems, components, assemblies, devices, user interfaces, environments, software, etc. described in conjunction with FIGS. 1-3.

The method of FIG. 4 begins with initialization. In FIG. 4, let {Ref.Eq_1, Ref.Eq_2, Ref.Eq_3} denote the reference coefficients for equalizers 220, 225, and 230, respectively. Let {LDF1, LDF2, LDF3; LDF4} represent equalizers 220, 225, 230 and 215, respectively.

In operation 400, the method begins by consulting a zone-table including (reference) coefficients for loop equalizers 220, 225, and 230, where the coefficients correspond to different locations on a track of a magnetic storage medium being read by read heads 194 and 196. The zone-table may include reference coefficients for the loop equalizers 220, 225, and 230 that vary according to a zone of a current sector or a current fragment. The zone-table may be programmable into firmware during the manufacturing stage of the storage system 100. Here, all of the loop equalizers are 2-Dimensional in structure (i.e., each equalizer receives digital data samples 205 and 210 from converter 200). Then, {LDF1, LDF2, LDF3; LDF4} are initialized with coefficients from {Ref.Eq_1, Ref.Eq_2, Ref.Eq_3; Ref.Eq_2}, respectively. An index T is used to denote the index of best-LDF for a fragment, and J is initialized with 2, since the best reader-location is expected to be around the center of the track for which the loop equalizer is Ref_Eq2. It should be understood throughout this description that a fragment refers to a portion or a fraction of a sector. In at least one example embodiment, loop equalizers LDF1 220 and LDF3 230 can also be chosen to be 1-Dimensional in nature, i.e. loop equalizer LDF1 220 receives its input from one of the digital samples 205 and 210, and loop equalizer LDF3 230 receives its input from the remaining one of the digital samples 205 and 210.

In operation 405, the method starts to read a current fragment. The MSE accumulators, in the MSE based diversity evaluation circuit 293, used for assessing which loop equalizer is good for a fragment, are reset at the beginning of a new fragment.

In operation 406, the method checks if the PSNR-Genie mode is triggered by consulting circuits 283, 285, and 251 of FIG. 2. If the absolute value of the difference between PSNR0 and PSNR1 exceeds a threshold, then a PSNR-Genie mode is triggered. If the PSNR-Genie mode is triggered, then in operation 408, the index of best-LDF is set to '1' if loop detector 235 is selected by PSNR selector circuit 285, and the corresponding loop equalizer LDF1 (220) is adapted in that fragment. Alternatively, in the PSNR-Genie mode, the index of best-LDF is set to '3' if loop detector 245 is selected by PSNR selector circuit 285, and the corresponding loop equalizer LDF3 (230) is adapted in that sector. Further, the loop equalizer LDF4 (215) is set to the reference coefficients of the loop equalizer selected for adaptation, i.e., LDF4 is set to Ref_Eq1 if J=1 and it is set to Ref_Eq3 if J=3.

If PSNR-Genie mode is not triggered in operation 406, then the method proceeds to operation 410.

In operation 410, the method checks if the current fragment is a first fragment in a new zone. If the current fragment is a first fragment in a new zone, equalizers {LDF1, LDF2, LDF3; LDF4} are set with coefficients {Ref.Eq_1, Ref.Eq_2, Ref.Eq_3; Ref.Eq_2}, respectively, following the initialization in operation 400. The method then proceeds to operation 450, described in more detail below.

If the current fragment is not a first fragment read in a new zone, then operation 419 takes note of the index of the best-LDF from a previous fragment, denotes as J which can be 1, 2 or 3. Then, operation 420 checks whether the data being read was recorded in a shingled magnetic recording (SMR) format, which refers to the tracks being written in sequential manner. If so, then operation 425 sets LDF4 to Ref_EqJ which is the reference coefficient corresponding to the best-LDF from previous fragment and retains LDFJ as the best-LDF from a previous fragment, and the method proceeds to operation 435, described in more detail below. If not, then the method continues to operation 430. More broadly, operation 420 checks whether a next fragment is assumed to have a same offtrack position as the current fragment, meaning that the two fragments were written in a single pass over the recording medium and hence, and hence there will be no diversity hole if an LDF is adapted. Thus, operations 420 and 425 cover a situation where sequential fragments are known to have the same offtrack position, which could be due to SMR writes or firmware that typically writes two sectors together in which all fragments of those two sectors have a same offtrack position).

Here, it should be understood that operations 420 and 425 are optional and may be skipped if desired. Checking for the SMR format may be an option that is user selectable. That is, the method can proceed from operation 419 to operation 430 without operations 420 and 425.

If operation 420 determines that the recording does not use SMR format, then operation 430 sets equalizer LDF4 to the best-LDF, LDFJ, from a previous fragment, and equalizer LDFJ is reset to its reference coefficient Ref_EqJ. The remaining LDFk for k not equal to J or 4 are left at the corresponding reference coefficients from the zone-table corresponding to the remaining two track locations.

At operation 435, the method detects the possible presence of a diversity-hole (see FIG. 6 for an example of a diversity-hole) that may occur due to a previous adaptation. The term 'diversity-hole' refers to an interval of reader-locations along the cross-track direction for which none of the three loop equalizers LDF1, LDF2 and LDF3 are suitable for delivering satisfactory detection performance from their associated loop detectors (see description of FIGS. 6 and 7 for more detail). Here, let $N_{HOL}$ be about 500 bits to allow for detection of a diversity-hole while $N_{OTD}$ is about 10,000 bits to allow for selection of a best equalized signal from the front-end component(s) of FIG. 2. For example, at bit instant $N_{HOL}$, operation 435 evaluates the MSE over the segment from bit $1 \pm N_{STRT}$ to bit $N_{HOL}$ [for all four equalizers 220, 225, 230 and 215 resulting in MSE(1, $N_{HOL}$), MSE(4, $N_{HOL}$)], where $N_{HOL}$-$N_{STRT}$ may be around 300-400 bits; the delay of $N_{STRT}$ is provided to allow for some control loops, e.g., gain-loop, to settle.

If, in operation 435, MSE(J, $N_{HOL}$)>MSE(4, $N_{HOL}$), a diversity-hole is not detected and hence the operation exchanges (or swaps) the coefficients of LDFJ and LDF4 in operation 445 (also exchange MSE(J, $N_{HOL}$) and MSE(4, $N_{HOL}$)) before proceeding to operation 450. This ensures that the best-LDF from a previous fragment is used as one of the loop equalizers driving the loop detector in a current fragment. Instead, if MSE(J, $N_{HOL}$)<MSE(4, $N_{HOL}$), then diversity-hole is detected and hence best-LDF from a previous fragment (i.e., LDFJ) is abandoned and is reset to its reference coefficients (done during operation 430), and the method proceeds directly to operation 450.

In operation 450, the method adapts the best-LDF LDFJ for the first $N_{OTD}$ bits and sets LDF4 to the reference coefficient Ref_EqJ of LDFJ.

In operation 455, the method determines which loop equalizer wins for the current fragment based on off-track diversity. At bit instant k=Nom, the method evaluates MSE over the segment from bit $1+N_{STRT}$ to bit $N_{OTD}$ (recall that $N_{OTD}$ is set to 10,000 as an example setting). The LDF that outputs a signal that has the minimum MSE is chosen as the LDF to be adapted for the remaining part of the current fragment (i.e., k0=arg{min{MSE(I, $N_{OTD}$)} for i=1, 2, 3, 4, where k0 is the index of the "winning" LDF and "i" represents the index of each loop equalizer {LDF1, LDF2, LDF3; LDF4}.

In operation 460, the method checks if k0=J. If so, it means the adapting equalizer LDFJ won the diversity-test and will continue to adapt for the rest of the fragment. If k0 is not equal to J, then the method proceeds to operation 465. In operation 465, the method first checks if k0=4. If k0=4, it means that the reference coefficients in LDF4 corresponding to the adapting equalizer LDFJ won the diversity-test, and hence the method sets k0=J. If k0 is not equal to 4, it means that the reference coefficients in LDFk for k not equal to J won the diversity-test. The method sets LDFJ to Ref_EqJ and LDF4 to Ref_Eq{k0} before proceeding to operation 475.

In operation 475, the method adapts the LDF that won the diversity test for the rest of the fragment or for the next $N_{OTD}$ samples, whichever is shorter, sets J to k0.

In operation 480, the method checks whether the end of the current fragment has occurred. If so, the method then returns to operation 405 to begin reading the next fragment as a current fragment. If not, the method proceeds to operation 485 to determine the diversity winning LDF for the next window of $N_{OTD}$ samples and starts by resetting the MSE accumulators. The diversity evaluation is abandoned if the next window has less than Nom samples and the method proceeds to 405 to read the next fragment.

Optionally, one may evaluate and compare the MSE of the loop equalizers at the end of the fragment to decide which is the best-LDF. Let k0 be the index of the LDF that has minimum MSE at end of fragment. If k0 is equal to existing J, then LDFJ is retained as the best-LDF when going to the next fragment. If k0 is not equal to J and k0=4, it means the reference coefficients in LDF4 is the best-LDF, and hence LDFJ is replaced with LDF4 and J is retained. Instead, if k0 is not equal to J and k0 is not equal to 4, it means the reference coefficients in LDFk for k not equal to J is the best-LDF, and hence J is set to k0.

In view of the described above in association with FIG. 4, the following points should be appreciated. In the case of sequential reads with no significant change in read head location, the adapting loop equalizer will continue to be the diversity-winning equalizer in each sector or fragment. The remaining two loop equalizers driving the loop-detectors will have the two reference coefficients that are most unlike the coefficient of the best loop equalizer in the MSE sense, thus providing the best off-track coverage. The third reference coefficient is also available in LDF4 to accommodate the scenario where the adapted loop equalizer from previous fragment is not the best equalizer in current fragment due to change in read head location. Further, any possible hole in diversity created (e.g., when Ref.Eq_2 moves close to Ref.Eq_1 due to adaptation and the read head location in next fragment happens to require Ref.Eq_2) can be resolved by the MSE comparison done at $N_{HOL}$ bits into the fragment.

Although method in FIG. 4 is described as being applied on a per-fragment basis, it should be understood that the method of FIG. 4 may also be carried out on a per-sector basis. In this case, the term "sector" is substituted for the term "fragment" in the description.

In view of the above, it should be understood that the MSE computed for each LDF in the diversity filter bank is used to make decisions at various stages during the sector. For example, the MSE based diversity evaluation circuit 293 in FIG. 2 may include a dedicated MSE module attached to each of the LDFs. A common stream of y-ideal samples are used for computing the MSE from all four loop equalizers. As mentioned above, these y-ideal samples are constructed using loop detector decisions 252 that are produced by selectors 250 and 251 from the 3 loop-detectors.

Since the specific loop equalizer that is taking the role of 'best-loop equalizer' (or best-LDF) can change at the decision-points $N_{HOL}$ & $N_{OTD}$, the method keeps track of MSEs computed for various loop equalizers so that there are consistent MSEs at the end-of-sector (or end-of-fragment) for the loop equalizers, if it is decided to use MSEs computed over the complete sector or fragment to choose the best-LDF when going from one fragment or sector to the next fragment or sector. The MSEs are calculated based on equation 1 below. In equation 1, the term "LDF" is substituted for the term "loop equalizer" and LDF stands for "loop DFIR".

Equation 1

$$MSE(k, l) = \sum_{n=N_1}^{N_2} |e_k(n)|^p$$

k=1,2,3,4, n=bit (user) index in the sector or fragment where $e_k(n)=y_k(n)-y(n)$, error at the output of $k^{th}$ LDF (i.e. LDFk), $y_k(n)$=output of LDFk, $y_{id}(n)$=ideal y-samples based on loop-detector decisions 252 and chosen partial response target, p=1, MSE is computed as sum of magnitude of errors, =2, MSE is computed as sum of squared-magnitude of errors, $[N_1, N_2]=N_{STRT}+[1, N_{HOL}]$, for diversity-hole test, $N_{STRT}+[(l-1)N_{OTD}+1, l \cdot N_{OTD}]$, to determine diversity-winning DFIR in $l^{th}$ window of $N_{OTD}$ samples.

$N_{STRT}$=number of user bits (samples) skipped from MSE computation at the start of sector.

In the above description, it should be understood that the zone-table reference coefficients contain the coefficients of 2-D equalizers for three selected track locations (or off-tracks) {Ref.Eq_1, Ref.Eq_2, Ref.Eq_3}. This set of coefficients is copied to loop equalizers {LDF-1, LDF-2, LDF-3, LDF-4} 220, 225, 230, and 215 as indicated in FIG. 4 and algorithm description above.

In order to determine the diversity-winning equalizer, an example block length used for the underlying MSE computation is about 10000 bits for 4K sector format and a full-sector for 0.5K sector format.

In the case of split-sectors, the diversity/pre-adaptation block may come from one or more fragments.

With respect to adaptation, it is assumed that only one loop equalizer will be adapting at any point in time from among the four equalizers 215, 220, 225, and 230. No loop equalizer is adapted until bit instant $N_{HOL}$, and the loop equalizer that passes the diversity-hole is adapted from $N_{HOL}$ until Nom, and the loop equalizer that wins the diversity is adapted from $N_{OTD}$ until end of fragment or sector. That is, start adaptation from $N_{HOL}+1$, i.e., directly after the test for diversity-hole, for the loop equalizer LDFJ that is perceived to be the best-equalizer for the current sector. In this case, LDF4 will be set to the reference coefficient corresponding to the adapting equalizer LDFJ.

FIG. 5 illustrates a method for the pre-adaptation and adaptation operations discussed with respect to FIGS. 1-4. FIG. 5 is a flow diagram of a method for operating the storage system 100 described with respect to FIGS. 1-4. While a general order for the steps of the method is shown in FIG. 5, the method can include more or fewer steps or can arrange the order of the steps differently than those shown in FIG. 5. Generally, the method starts at operation 500 and ends at operation 540. The method can be executed as a set of computer-executable instructions executed by the interface controller 120 and encoded or stored on a computer readable medium. Alternatively, the operations discussed with respect to FIG. 5 may be implemented by the various elements of the storage system 100 described with respect to FIGS. 1-4. Hereinafter, FIG. 5 shall be explained with reference to the systems, components, assemblies, devices, user interfaces, environments, software, etc. described in conjunction with FIGS. 1-4.

In FIG. 5, BDF-0 corresponds to back-end equalizer 255 while BDF-1 corresponds to back-end equalizer 270.

In operation 500, the method begins with the start of the current fragment. In operation 505, the method checks whether the current fragment is a first fragment in a new zone. If so, in operation 510, BDF-0 and BDF-1 are initialized with reference coefficients for back-end equalizer from the zone-table before proceeding to operation 520. If not, in operation 515, BDF-0 is initialized with the current coefficients of BDF-1 (see copy operation in FIG. 3).

In operation 520, BDF-0 adapts over one block of digital data samples 205 and 210 with a relatively large adaptation gain while the digital data samples are delayed (e.g., with delay line 265) by one block for BDF-1.

In operation 525, the method determines whether head-TMR has occurred. Here, the term 'head-TMR' refers to change in positions of the plurality of magnetic read heads 194 and 196 from a read operation of the previous sector (e.g., as determined by head TMR sensor 295). If head-TMR has not occurred, the method proceeds to operation 530 and retains the current coefficients of BDF-1. If head-TMR has occurred, the method performs operation 535 to initialize BDF-1 with the coefficients from BDF-0 (see FIG. 3). The logic (e.g., in head-TMR sensor 295) to determine occurrence of head-TMR is as follows. Head-TMR is assumed to occur in fragment k if (LDF_Index_Div(k)≠2); or (BDF_Dist(k)≥BDF_Thr) if fragment k is the first fragment read in a zone. If fragment k is not the first fragment read in a new zone, head-TMR is assumed to have occurred if (LDF_Index_Div(k)≠LDF_Index_Div(k−1)); or (BDF_Dist (k)≥BDF_Thr). Here, LDF_Indx_Div(k) is the index of the loop equalizer that wins the diversity-test at the end of the pre-adaptation block-length ($N_{PREAD}$) in fragment k; BDF_Dist(k) is the sum of the magnitude of the difference between the coefficients of BDF-0 before and after pre-adaptation in fragment k; indices of reference loop equalizers {Ref.Eq_1, Ref.Eq_2, Ref.Eq_3} corresponding to {negative off-track, track-center, positive off-track} are taken as {1,2,3}, respectively; and the index of a loop equalizer, whose coefficients are obtained by adapting a reference coefficient, is same as that of the particular reference coefficient which defined its starting coefficients. The length of the block used for pre-adaptation, $N_{PREAD}$, is a design parameter. In at least one example embodiment, the block length $N_{PREAD}$ used for pre-adaptation is about 10000 bits for 4K sector format and a full-sector for 0.5K sector format.

In operation 540, back-end equalizer BDF-1 is adapted using the loop detector decisions 252 and the digital data samples 205, 210 over the complete fragment with normal adaptation gain.

The method returns to operation 505 to process a next fragment.

Adaptation gains of back-end equalizers BDF-0 & BDF-1 are individually programmable.

BDF distance metric is calculated by Equation 2.

Equation 2

$$\text{BDF\_Dist}(k) = \sum_{i=1}^{M} |w_{1,i}(k) - \tilde{w}_{1,i}(k)| + \sum_{i=1}^{M} |w_{2,i}(k) - \tilde{w}_{2,i}(k)|,$$

M=number of coeffs in BDF-0 for each reader
where $[w_{1,1}(k), w_{1,2}(k), \ldots w_{1,M}(k); w_{2,1}(k), w_{2,2}(k), \ldots w_{2,M}(k)]$=coeffs of BDF-0 for Reader-1 194 & Reader-2 196 before pre-adaptation, $[\tilde{w}_{1,1}(k), \tilde{w}_{1,2}(k), \ldots, \tilde{w}_{1,M}(k), \tilde{w}_{2,1}(k), \tilde{w}_{2,2}(k), \ldots, \tilde{w}_{2,M}(k)]$=coeffs of BDF-0 for Reader-1194 & Reader-2 196 after pre-adaptation.

Figure 6:
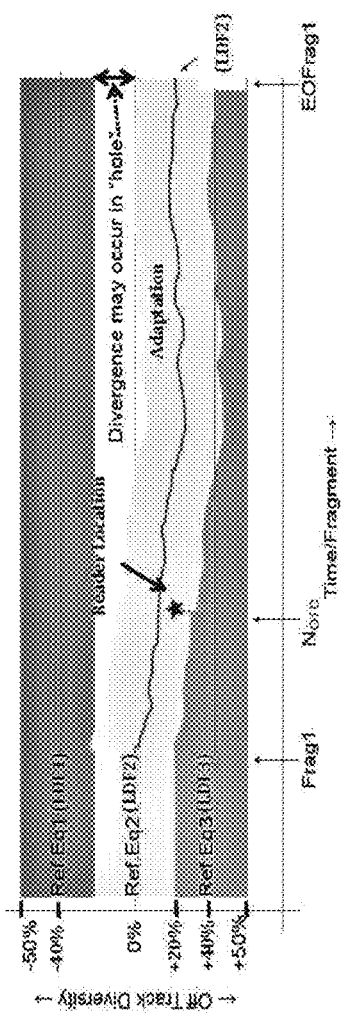
FIG. 6 illustrates an example of a diversity hole, which may be mitigated (or alternatively, avoided) by the storage system of FIGS. 1-5.

FIG. 6 illustrates an example of a diversity hole, which may be mitigated (or alternatively, avoided) by the storage system according to at least one example embodiment.

This phenomenon of diversity-hole happens when a coefficient of one loop equalizer moves towards the coefficient of another loop equalizer due to adaptation over the course of one or more sectors or fragments. As FIG. 6 shows, the reference coefficients of the loop equalizers LDF1, LDF2 and LDF3 are taken to correspond to offtrack locations −40%, 0% and +40%, respectively, such that they could cover the complete cross-track range of −50% to +50% of the track-pitch. That is, Ref.Eq_1 is a reference coefficient selected to optimize reader accuracy/performance if the reader reads at a location within the track that corresponds to −40% (e.g., left-of-center within the track), Ref.Eq_2 is a reference coefficient selected to optimize reader accuracy/performance if the reader reads at a location within the track that corresponds to 0% (e.g., the center of the track), and Ref.Eq_3 is a reference coefficient selected to optimize reader accuracy/performance if the reader reads at a location within the track that corresponds to +40% (e.g., right-of-center of the track).

FIG. 6 illustrates a scenario where the reader (consisting of two heads 194 and 196) is located at offtrack location +20% in a particular fragment (depicted with a star symbol). Then, LDF2 wins the diversity-test and is adapted through the complete fragment. Due to adaptation, as FIG. 6 shows, LDF2 coefficients move to match +20% location by end of the fragment. This results in certain interval of offtrack locations between LDF1 and LDF2 to be exposed without coverage (see the interval between 0% and about −20% indicated by the double-arrow). If the reader-location in next fragment happens to be anywhere within this exposed interval, the detection performance may suffer.

In the next fragment, if the reader location happens to be at −10% which is in the interval between 0% and −20% in FIG. 6 (e.g., if this fragment was a randomly written fragment), then none of the current loop equalizer coefficients of LDF1, LDF2 and LDF3 which are {Ref.Eq_1, adapted version of Ref.Eq_2, Ref.Eq_3} will be good for performing data detection compared to if Ref.Eq_2 (at 0%) was available. This creates a so-called diversity hole, which can limit the accuracy/performance of the reader due to the equalizer coefficients being mismatched to the reader location in the track.

In one example embodiment, however, a diversity-hole is mitigated (or alternatively, prevented) by keeping the reference coefficients of the loop equalizer LDF2 before adaptation, i.e. Ref_Eq2, in the loop equalizer LDF4, so that it can be restored to LDF2 if diversity-hole is detected upon doing the MSE based diversity-hole test as described in connection with operation 435 in FIG. 4.

Example embodiments substantially reduce (or alternatively, prevent) the occurrence of diversity holes because: i) for the first $N_{HOL}$ bits (~500 bits) in each fragment, the loop equalizers 220, 225, and 230 feeding the three loop detectors are {Ref_Eq_1, Ref.Eq_2, Ref.Eq_3} while the coefficients of the adapted loop equalizer from previous fragment (LDF2 in the example shown in FIG. 6) resides in loop equalizer 215 (LDF4); and ii) the diversity-hole test around 500th bit will confirm that Ref.Eq_2 is a better coefficient compared to LDF2 from previous fragment. As a result, coefficient LDF2 from previous fragment (i.e., the adapted version of Ref.Eq_2 from previous fragment) will not be used at all in current fragment, and adaptation re-starts from Ref.Eq_2 in current fragment (and loop equalizer 215 is reset to Ref.Eq_2).

Figure 7:
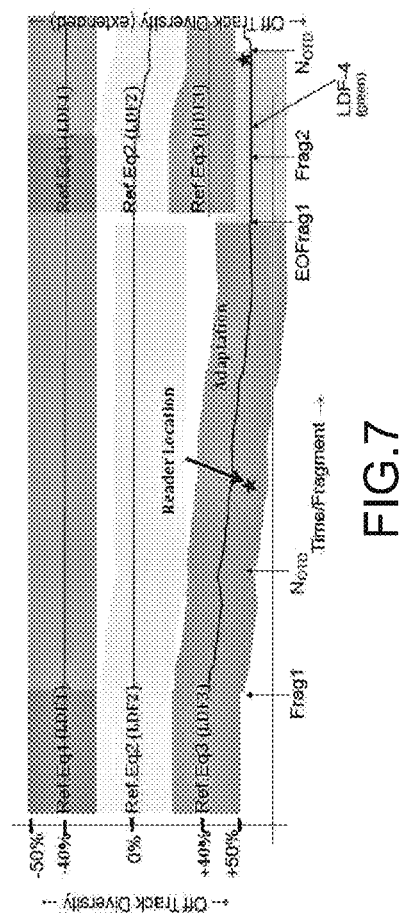
FIG. 7 illustrates an example of how LDF4 in FIG. 2 may extend offtrack coverage.

FIG. 7 illustrates how the reference coefficient for LDF4 may help to extend the overall range of offtrack coverage compared to the case where use is made of only the three loop equalizers LDF1, LDF2 and LDF3. The reference coefficients of the loop equalizers {Ref.Eq_1, Ref.Eq_2, Ref.Eq_3} are chosen corresponding to offtrack locations {−40%, 0%, +40%} as was considered in FIG. 6. FIG. 7 illustrates a scenario where the reader (consisting two heads 194 and 196) is located at offtrack location +50% in a particular fragment. Then, LDF3 wins the diversity-test and it is adapted through the complete fragment. Due to adaptation, as FIG. 7 shows, LDF3 coefficients move to match +50% location by end of the fragment. When LDF3 is getting adapted, LDF4 contains its reference coefficient Ref.Eq_3. As a result, when the next fragments starts, the offtrack coverage offered by {LDF1, LDF2, LDF3, LDF4} is extended by almost 20% on the positive side of the track, resulting in a range of −50% to +70%, which is much wider than the original range of −50% to +50% by {Ref.Eq_1, Ref.Eq_2,Ref.Eq_3}.

In view of the foregoing description, it should be appreciated that example embodiments provide quick adaptation to give improved or near-optimal performance under conditions of varying reader location and squeeze. Further, there is no need for explicit estimation of head position or squeeze. Example embodiments provide a loop detector with cross-track diversity, where three parallel loop-detectors are each optimized for a different position on track (e.g., negative offset, zero offset (i.e. track-center), positive offset, which allows for automatic selection of detector with minimum path metric. A fourth 2-D equalizer (e.g., loop equalizer 215) is added to catch occurrence of any possible hole in the diversity range (e.g., a hole is created when one of the three 2-D equalizers gets closer to another one with adaptation). Example embodiments also provide fast pre-adaptation of the back-end equalizer of a read channel to determine the best starting taps of the back-end equalizer, with pre-adaptation having a large adaptation gain to better-initialize the equalizer used for main adaptation. Further still, special logic is put in place to ensure that benefit from adaptation is maintained when there is no significant change in location of the reader from one fragment or sector to next. This alleviates concerns related to the false/incorrect re-initialization arising from inaccuracy in estimated location.

Although example embodiments have been described with respect to systems that include two or more read heads, it should be understood that example embodiments may also apply to single read head systems. It should be further understood that example embodiments may be implemented without LDF4, for example, in cases where the occurrence and impact of diversity-holes are not considered significant.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An apparatus for reading data from a magnetic storage medium, the apparatus comprising:
   a plurality of magnetic read heads each configured to read a track of the magnetic storage medium and generate an analog data signal corresponding to the read track; and
   a converter to generate digital data samples from the analog data signals;
   a plurality of loop equalizers to apply a plurality of coefficients to the digital data samples to generate a plurality of equalized signals, the plurality of coefficients being associated with different locations within the track;
   a plurality of detectors to compute metrics and detect data bits according to the plurality of equalized signals; and
   at least one selector to select one of the plurality of equalized signals that has a best metric from the computed metrics and to output corresponding detected data bits of selected equalized signal.

2. The apparatus of claim 1, wherein each equalizer in the plurality of loop equalizers receives the plurality of data samples, applies one of the plurality of coefficients, and outputs one of the plurality of equalized signals.

3. The apparatus of claim 2, wherein the different locations within the track include a first location, a second location, and a third location, and
   wherein the plurality of loop equalizers includes at least a first loop equalizer applying a first coefficient associated with the first location, a second loop equalizer applying a second coefficient associated with the second location, and a third loop equalizer applying a third coefficient associated with the third location.

4. The apparatus of claim 3, wherein the second location is near a center of the track, and the first location and the third location are offset from the second location on both sides of the second location.

5. The apparatus of claim 3, wherein the plurality of loop equalizers further comprises:
   a fourth loop equalizer having a fourth coefficient that is the same as whichever one of the first, second, and third coefficients produced the selected equalized signal.

6. The apparatus of claim 1, further comprising:
   one or more back-end components to apply at least one back-end coefficient to the digital data samples to generate an output signal.

7. The apparatus of claim 6, wherein the one or more backend components further comprises:
   a first back-end equalizer to generate a first back-end coefficient over a block of samples of the digital data samples that correspond to a partial sector or a partial fragment; and
   a second back-end equalizer to apply a second back-end coefficient over samples of a delayed version of the digital data samples that corresponds to an entire sector or an entire fragment.

8. The apparatus of claim 7, wherein the delayed version of the digital data samples is delayed by a time that corresponds to a time taken by the first back-end equalizer to receive the block of samples that corresponds to the partial sector or the partial fragment.

9. The apparatus of claim 7, wherein the second back-end equalizer is initialized with the first back-end coefficient if positions of the plurality of magnetic read heads are determined to have changed from a read operation of a previous sector or a previous fragment, and
   wherein the second back-end equalizer is initialized with a previous back-end coefficient from the read operation the previous sector or the previous fragment if the positions of the plurality of read heads are determined to not have changed from the read operation of the previous sector or the previous fragment.

10. The apparatus of claim 9, wherein whether the positions of the plurality of read heads have changed from the previous sector or the previous fragment is based on at least one of i) whether a difference between the first back-end coefficient of a current sector or a current fragment and the first back-end coefficient of the previous sector or the previous fragment is greater than a threshold value, and ii) whether the loop equalizer that produced the selected equalized signal is different in the current sector or the current fragment compared to the previous sector or the previous fragment.

11. A method for reading data from a magnetic storage medium, the method comprising:
reading, by a first magnetic read head, a track of the magnetic storage medium at a first position in the track and generating a first analog data signal corresponding to data read at the first position;
reading, by a second magnetic read head, the track of the magnetic storage medium at a second position in the track and generating a second analog data signal corresponding to data read at the second position; and
converting the first and second analog signals into digital data samples;
equalizing the digital data samples to generate a plurality of equalized signals, each equalized signal being generated based on one of a plurality of coefficients, the plurality of coefficients being predetermined and associated with different lateral locations within the track;
constructing path metrics and detecting data bits for the plurality of equalized signals;
selecting one of the plurality of equalized signals that has a minimum path metric from the constructed path metrics; and
outputting corresponding detected data bits of the selected equalized signal.

12. The method of claim 11, wherein the different lateral locations within the track include a first location, a second location, and a third location, and
wherein the equalizing includes applying a first coefficient to the digital data samples that is associated with the first location, applying a second coefficient to the digital data samples that is associated with the second location, and applying a third coefficient to the digital data samples that is associated with the third location.

13. The method of claim 12, wherein the second location is near a center of the track, and the first location and the third location are offset from the second location on both sides of the second location.

14. The method of claim 12, further comprising:
maintaining a fourth coefficient that is the same as whichever one of the first, second, and third coefficients produced the selected equalized signal.

15. The method of claim 11, further comprising:
applying at least one backend coefficient to the digital data samples to generate an output data signal.

16. The method of claim 15, wherein the applying at least one backend coefficient further comprises:
generating a first back-end coefficient based on a block of samples of the digital data samples that corresponds to a partial sector or a partial fragment; and
applying a second back-end coefficient over a delayed version of the digital data samples that corresponds to an entire sector or an entire fragment.

17. A read channel of a magnetic storage system, the read channel comprising:
a converter to analog data signals into digital data samples, the analog data signals corresponding to data read from a track of a magnetic storage medium by at least two magnetic read heads;
a plurality of loop equalizers to apply a plurality of coefficients to the digital data samples to generate a plurality of equalized signals, the plurality of coefficients being associated with different locations within the track;
a plurality of detectors to construct path metrics and detect data bits for the plurality of equalized signals; and
at least one selector to select one of the plurality of equalized signals that has a minimum path metric from the constructed path metrics and to output corresponding detected data bits of the selected equalized signal.

18. The read channel of claim 17, wherein each equalizer in the plurality of loop equalizers receives the plurality of digital data samples, applies one of the plurality of coefficients, and outputs one of the plurality of equalized signals.

19. The read channel of claim 17, wherein the different locations within the track include a first location, a second location, and a third location, and
wherein the plurality of loop equalizers includes at least a first equalizer applying a first coefficient associated with the first location, a second equalizer applying a second coefficient associated with the second location, a third equalizer applying a third coefficient associated with the third location.

20. The read channel of claim 17, wherein the second location is near a center of the track, the first location is at a first side of the second location, and the third location is at a second side of the second location that is opposite the first side.

* * * * *